Patented Jan. 13, 1953

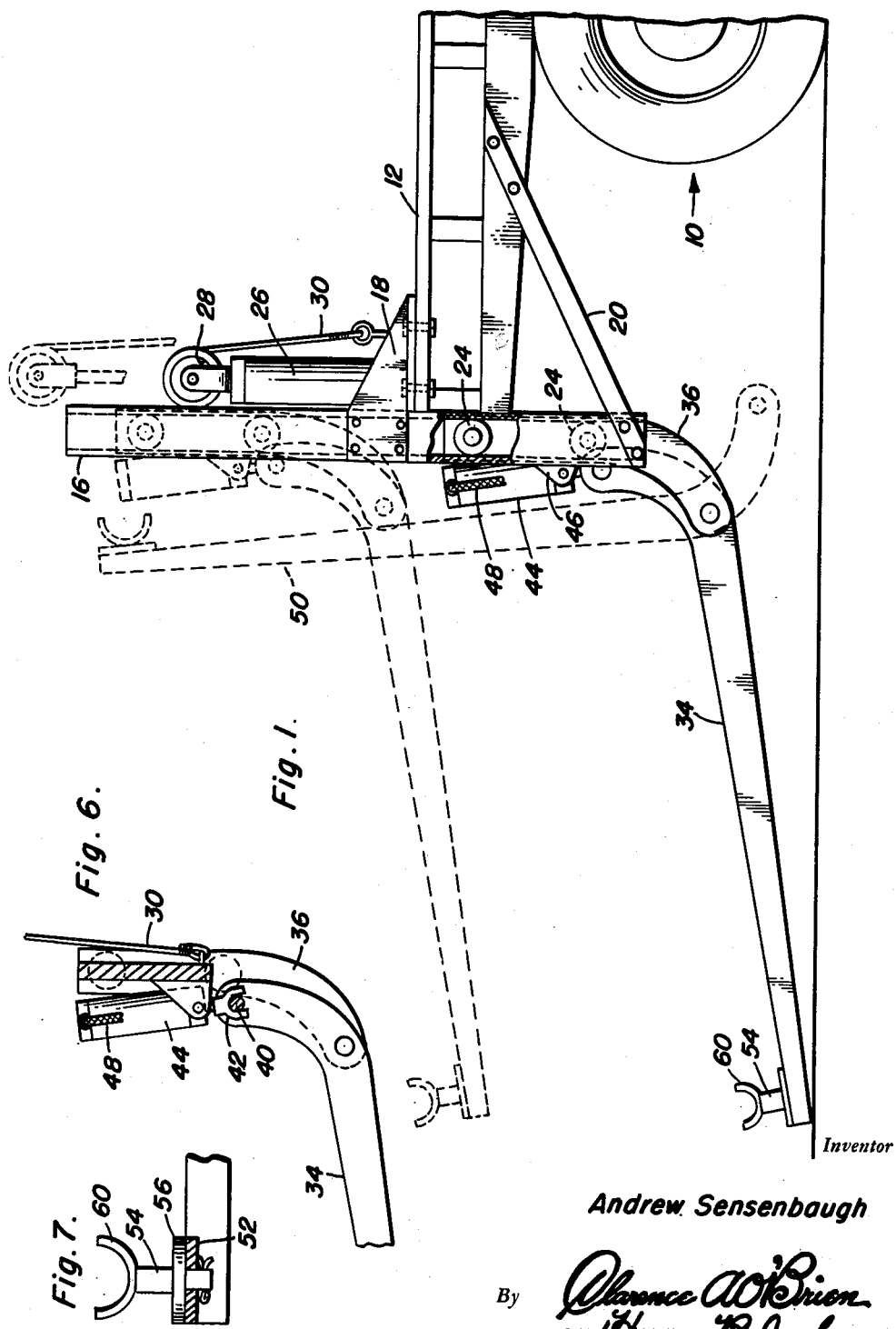

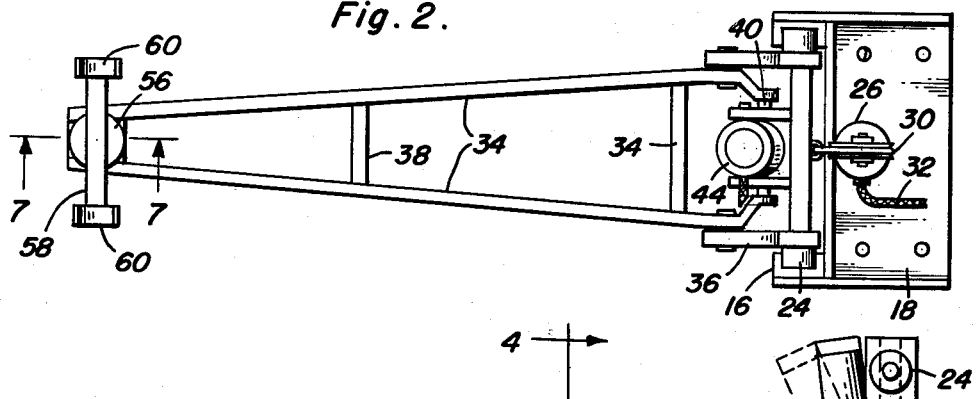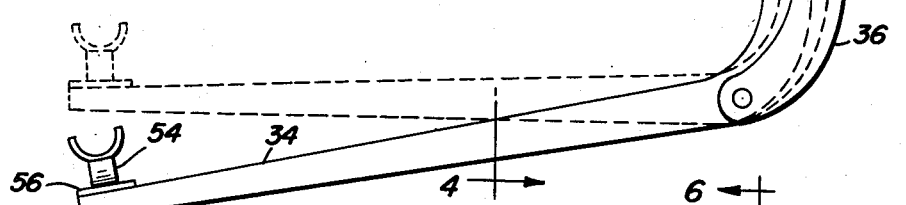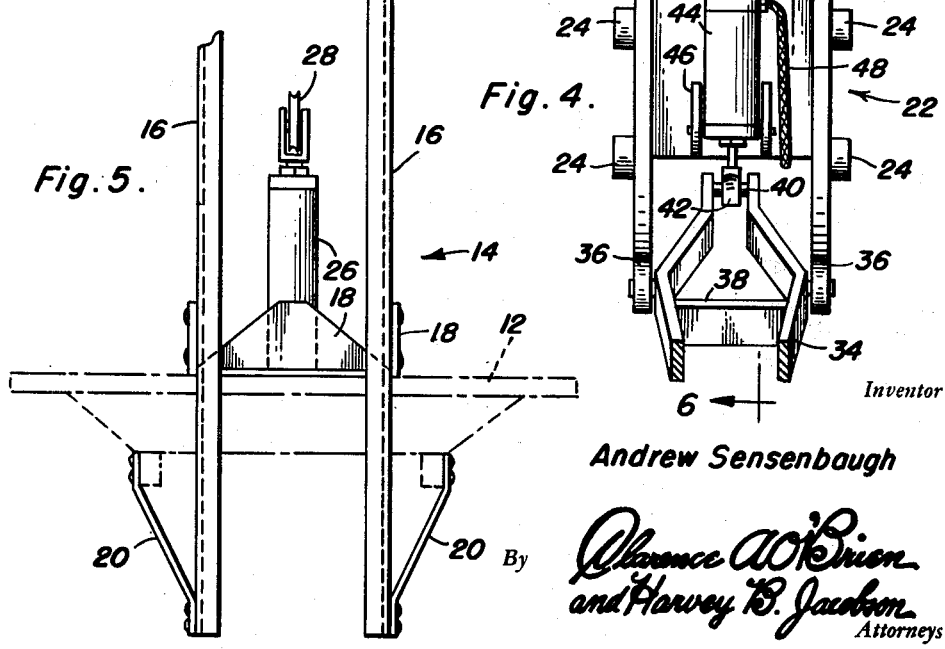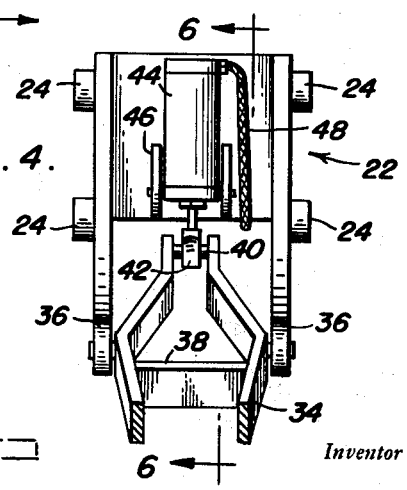

2,625,278

UNITED STATES PATENT OFFICE 2,625,278

HYDRAULIC TOW BAR

Andrew Sensenbaugh, Elkhart, Ind.

Application September 30, 1949, Serial No. 118,860

1 Claim. (Cl. 214—86)

This invention relates generally to handling and hoisting equipment and more particularly to a hydraulic tow bar assembly for wrecking cars and the like. A primary object of this invention is to provide a tow bar assembly in which the tow bar per se is pivotally mounted upon a carriage, which latter is vertically slidably mounted in a frame, allowing the tow bar to be disposed substantially horizontally in order that the same may slide easily underneath front or rear end portions of a disabled automobile or the like, the possibility of first lowering the carriage making it possible to achieve the horizontal positioning of the tow bar, it being understood that after the tow bar has been properly placed, as, for example, in engagement with the axle of the disabled car, then the whole assembly, including the tow bar and the carriage, will be raised.

Another object of this invention, ancillary to the preceding object, is to provide a tow bar assembly in which the tow bar can be engaged with the disabled car or the like even when the part to be engaged directly is positioned at a considerable distance from the corresponding end of the disabled vehicle, since the portion of the tow bar adjacent the wrecking bar can be lowered sufficiently to allow the tow bar easier entrance beneath the disabled vehicle, and when the tow bar assembly is not in actual operation, the whole assembly can be raised a satisfactory distance from the road bed.

Another object of this invention is to provide a tow bar assembly in which the tow bar per se can be raised as a whole above high curbing or like obstructions, in order to reach over the same in facilitating the retrieving of wrecked automobiles or portions thereof positioned on the side of such high curbing or other obstruction remote from the road bed, this feature being understandable when it is realized that an ordinary tow bar cannot be raised as far as the part thereof fixed to the wrecking car is concerned, this invention providing means to raise this same portion in order that a greater reach is procured.

And a last object to be mentioned specifically is to provide a tow bar assembly which will include practically all of the advantages to be found in other tow bar assemblies, together with the added features mentioned above, which is relatively inexpensive and practicable to manufacture, which is safe, simple and convenient to use, and which will give generally efficient and durable service.

With these obects definitely in view, this invention resides in certain novel features of construction, combination and arrangement of elements and portions as will be hereinafter described in detail in the specification, particularly pointed out in the appended claims, and illustrated in the accompanying drawings which form a material part of this application, and in which:

Figure 1 is a side elevational view of this invention operatively applied to a wrecking car, the latter being fragmentarily shown, the carriage being shown in two positions, and the tow bar per se being shown in three positions;

Figure 2 is a top plan view of the tow bar assembly;

Figure 3 is a side elevational view of the tow bar and the carriage with the cylinder used to operate the tow bar, shown in two positions, the parts shown being separated from the other elements of this invention in order to amplify the disclosure of this invention and to simplify its representation;

Figure 4 is a vertical sectional view, taken substantially on the line 4—4 in Figure 3;

Figure 5 is a rear end view of the frame which is mounted on the wrecking vehicle and the cylinder used to raise the carriage, the other portions of the invention being removed to simplify the figure;

Figure 6 is a vertical sectional view, taken substantially on the line 6—6 in Figure 4 to show the removable connection between the tow bar and the cylinder operating the same; and Figure 7 is a vertical sectional view taken on the line 7—7 of Figure 2.

Similar characters of reference designate similar or identical elements and portions throughout the specification and throughout the different views in the drawings.

Referring now to the drawings in detail, this invention is used with an environment including a towing vehicle fragmentarily indicated at 10 and having a frame construction 12 upon which the frame generally indicated at 14 for the tow bar assembly is rigidly mounted by any suitable means. The tow bar assembly frame 14 includes a pair of opposed vertical channel members 16, central portions of which will be secured to the frame members 12 of the towing vehicle by bracket structures such as that indicated at 18 and by braces 20.

A carriage generally indicated at 22 in Figure 4 is slidably mounted in the frame 14, the carriage having pairs of vertically spaced rollers 24 engaged in the oppositely disposed channel members 16, on each side of the carriage, so that the carriage has a relatively friction-free mounting within the channel members yet limited to vertical movement therein only.

A hydraulic cylinder 26 is preferably mounted on the bracket 18 and its piston carries a pulley 28, the cylinder being mounted vertically immediately in front of the carriage, and a cable 30 is terminally secured to the frame at one end and entrained over the pulley 28 for connection to the carriage. It will be understood that a source of fluid under pressure will be operatively connected with the cylinder 26 and controlled by the operator of the device, all of which is conventional and thought to be unnecessary in this disclosure, except as to diagrammatic representation at 32.

The tow bar is comprised of a pair of spaced elongated inflexible members 34 pivoted upon projecting arm portions 36 of the carriage, near the ends thereof adjacent the towing vehicle, a suitable number of cross braces 38 being rigidly secured to and between the members 34. One of said cross bars 40 is of particular importance, inasmuch as this cross bar is secured to the extremities of the members 34 and comprises a pivot member for releasable engagement with a bifurcated member 42 on the outer end of the piston in a second hydraulic cylinder 44. This second hydraulic cylinder is pivotally mounted on lugs 46 of the carriage and is operatively connected with a source of fluid under pressure, as diagrammatically indicated at 48, so that actuation of the cylinder will cause the end of the tow bar adjacent the towing vehicle to be pushed downwardly so as to raise the outer end of the tow bar, while allowing disengagement of the pivot cross bar 40 from the bifurcated member 42, whereby the tow bar can be raised into nearly vertical position when not in use, as indicated in the position identified by the reference numeral 50 in Figure 1, the means for retaining the tow bar in this position being ordinarily a cable or the like which is thought unnecessary to be illustrated here.

The grapple for actually engaging axles of disabled vehicles and the like is mounted on a cross plate 52 on the outer end of the tow bar, this plate being apertured to receive the lower end of a stub shaft 54 which is rigidly secured to a circular plate 56 frictionally engaging the upper surface of the plate 52. The shaft 54 carries at its upper end a cross arm 58 having U-shaped axle-engaging members 60 on each end.

The operation of this invention will be clearly understood from a consideration of the foregoing description of the mechanical details thereof taken in connection with the drawings and the above recited objects. Briefly stated, the carriage is lowered and the tow bar per se is pivoted downwardly into the full line position shown in Figure 1. The cylinder 44 is then operated to tilt the tow bar, and then the carriage with the tow bar is raised by actuating the cylinder 26. When not in use, the tow bar can be tilted as shown at 50 in Figure 1.

Having described the invention, what is claimed as new is:

A tow bar assembly comprising a frame having vertical guide rails, a carriage vertically slidable on said rails, means for sliding said carriage vertically, a tow bar pivoted on said carriage for vertical swinging and having a cross bar spaced from the pivot of said tow bar, a hydraulic cylinder mounted on said carriage with a downwardly acting piston, a bifurcated member on said piston engaging said cross bar upon downward action of the piston to swing said tow bar toward upright position, said tow bar being manually swingable toward upright position to disengage said cross bar from said member and provide for manual swinging of the tow bar into upright position.

ANDREW SENSENBAUGH.

REFERENCES CITED

The following references are of record in the file of this patent:

UNITED STATES PATENTS

| Number | Name | Date |
|---|---|---|
| 1,895,939 | Presbrey | Jan. 31, 1933 |
| 2,067,954 | Tetrault | Jan. 19, 1937 |
| 2,113,879 | Delelandre | Apr. 12, 1938 |
| 2,437,010 | Way | Mar. 2, 1948 |
| 2,449,146 | Ryan | Sept. 14, 1948 |
| 2,495,493 | Wright | Jan. 24, 1950 |
| 2,512,733 | Andersen et al. | June 27, 1950 |